United States Patent [19]

Menlove et al.

[11] Patent Number: 4,617,466
[45] Date of Patent: Oct. 14, 1986

[54] DIRECT FISSILE ASSAY OF ENRICHED URANIUM USING RANDOM SELF-INTERROGATION AND NEUTRON COINCIDENCE RESPONSE

[75] Inventors: Howard O. Menlove; James E. Stewart, both of Los Alamos, N. Mex.

[73] Assignee: The United States of America as represented by the United States Department of Energy, Washington, D.C.

[21] Appl. No.: 697,989

[22] Filed: Feb. 4, 1985

[51] Int. Cl.[4] .................................................. G01T 3/00
[52] U.S. Cl. .................................. 250/390; 250/391
[58] Field of Search .............. 250/370 B, 390 C, 391, 250/392, 358.1, 359.1; 376/257

[56] References Cited

U.S. PATENT DOCUMENTS 3,636,353  1/1972  Untermyer ........................... 376/257
3,736,429  5/1973  Foley ................................ 250/390 C
3,786,256  1/1974  Untermyer ........................... 250/391

OTHER PUBLICATIONS

Gozani, "Active Nondestructive Assay of Nuclear Materials", NUREG/CR-0602, pp. 507-520, Jan. 1981.
Rogers, "Handbook of Nuclear Safeguards Measurement Methods", NUREG/CR-2078 (MLM-2855), pp. 4-6, 74-84, 174-178, 208-216, 259, 260, 269, 272, Sep. 1983.
Stewart et al, "Direct Fissile Assay of Highly Enriched UF$_6$ Using Random Self-Interrogation and Neutron Coincidence Response", Los Alamos Nat. Lab., LA-UR-83-3266, May 1984.

Primary Examiner—Carolyn E. Fields
Attorney, Agent, or Firm—Samuel M. Freund; Paul D. Gaetjens; Judson R. Hightower

[57] ABSTRACT

Apparatus and method for the direct, nondestructive evaluation of the $^{235}U$ nuclide content of samples containing $UF_6$, $UF_4$, or $UO_2$ utilizing the passive neutron self-interrogation of the sample resulting from the intrinsic production of neutrons therein. The ratio of the emitted neutron coincidence count rate to the total emitted neutron count rate is determined and yields a measure of the bulk fissile mass. The accuracy of the method is 6.8% ($1\sigma$) for cylinders containing $UF_6$ with enrichments ranging from 6% to 98% with measurement times varying from 3-6 min. The samples contained from below 1 kg to greater than 16 kg. Since the subject invention relies on fast neutron self-interrogation, complete sampling of the $UF_6$ takes place, reducing difficulties arising from inhomogeneity of the sample which adversely affects other assay procedures.

8 Claims, 4 Drawing Figures

DIRECT FISSILE ASSAY OF ENRICHED URANIUM USING RANDOM SELF-INTERROGATION AND NEUTRON COINCIDENCE RESPONSE

BACKGROUND OF THE INVENTION

The subject invention relates generally to assay of nuclear materials and more particularly to the use of self-interrogation and neutron coincidence counting to determine the quantity of fissile nuclides in samples of uranium hexafluoride. This invention is a result of a contract with the Department of Energy (Contract No. W-7405-ENG-36).

The measurement of fissile mass in uranium samples is required for safeguards, accountability, and criticality control of nuclear materials. These materials are found in uranium enrichment plants, fuel fabrication facilities, nuclear reactors, and reprocessing facilities. Two references which summarize active and passive methods for analyzing nuclear materials are: 1. *Active Nondestructive Assay of Nuclear Materials* by Tsahi Gozani, NUREG/CR-0602, January 1981, and 2. *Handbook of Nuclear Safeguards Measurement Methods,* by Donald R. Rogers, NUREG/CR-2078 (MLM-2855), September 1983. For some types of nuclear materials, the procedures described therein are inadequate or impractical. Passive signatures are often not available or not sufficiently penetrating to sample all of the material. Moreover, neutron interrogation sources employed to overcome these difficulties are costly and require considerable shielding and maintenance. An example of the latter systems can be found in U.S. Pat. No. 3,636,353 "Method and Apparatus for the Nondestructive Assay of Bulk Nuclear Reactor Fuel Using 1 keV. to 1 MeV. Range Neutrons," issued to Samuel Untermyer on Jan. 18, 1972. Therein, the inventor describes irradiation of the uranium fuel elements to be analyzed by neutrons followed by the detection of emitted neutrons and gamma radiation.

The conventional nondestructive, passive method for measuring $^{235}U$ enrichment in $UF_6$ involves the counting of the 186-keV gamma-ray emissions from the $^{235}U$ using NaI or germanium detectors. An ultrasonic measurement of the wall thickness of the container must be made to correct for variations in gamma-ray attenuation in the walls. The measured $^{235}U$ enrichment, the net $UF_6$ weight, and the uranium weight fraction must be combined to yield the desired $^{235}U$ mass. A disadvantage of this type of measurement is that it is the enrichment of the outer 5–10 mm of the sample only that is sampled due to strong absorption of the gamma-rays by the bulk of the sample. Therefore, it is necessary to assume that the sample is homogeneous in order to interpret the results. Other disadvantages of the above-described procedure include the fact that a separate measurement of the wall thickness must be made, and that if the sample has been irradiated in a reactor, it may contain sufficient quantities of technetium that increase the gamma-ray background from the sample, thereby altering the accuracy of the measurement.

Gas-phase sampling of the materials under investigation followed by mass spectrometric determination of the $^{235}U$ enrichment is often biased by inhomogeneities such as layering in addition to being costly and time-consuming.

SUMMARY OF THE INVENTION

Accordingly, an object of the present invention is to provide an apparatus for passively determining the assay of fissile material in samples of uranium hexafluoride.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention includes a group of neutron detectors embedded in polyethylene moderator and arranged around the surface of at least one substantially concentric sample cylinder in such a manner that a fraction of neutrons escaping a cylindrical sample placed along the axis of the cylindrical array of neutron detectors and substantially within its region of detection are detected by the detectors, the neutron detectors thereby producing signals in response thereto, and means for receiving the signals produced by the neutron detectors and for recording the total number of neutrons exiting the sample and reaching the detectors, and the total number of neutrons reaching the detectors within a chosen time interval, whereby the ratio of the number of neutrons reaching the neutron detectors in coincidence within the chosen time interval to the total number of neutrons reaching the detectors may be related to the quantity of fissile material present in the sample under investigation. Preferably, a cylindrical cadmium sheet is inserted between the cylindrical sample and the group of cylindrically disposed neutron detectors, to prevent low-energy neutrons from returning thereto as a result of backward scattering from the polyethylene. When the cadmium sheet is removed, the change in the total number of neutrons reaching the group of detectors can be used to correct for density variations in the sample, and for sample cylinders which have not been completely filled.

In a further aspect of the present invention, in accordance with its objects and purposes, the method hereof includes detecting a major portion of the neutrons emitted from the sample under investigation occurring as a result of $(\alpha, n)$ reactions, thereby producing a signal which is proportional to the number of neutrons detected, detecting a major portion of the neutrons emitted from the sample under investigation occurring in pairs within a chosen time period, thereby producing a signal which is proportional to the number of neutron pairs detected, and forming the ratio of the signal which is proportional to the number of neutron pairs to the signal which is proportional to the total number of neutrons detected, said ratio having substantial relationship to the quantity of fissile material contained in the sample under investigation. It is preferred that a substantial number of neutrons exiting the sample are returned thereto and that the ratio of neutron pairs to the total number of neutrons is redetermined and further corrected by the measurement of the total number of neutrons exiting the sample under investigation without the step of returning a substantial number of the neutrons exiting the sample to the sample, whereby the corrected ratio is more closely related to the quantity of fissile material contained in the sample under investigation.

Benefits and advantages of the subject invention include simple, rapid, nondestructive, passive quantitative assay of bulk samples of uranium hexafluoride for fissile nuclide content without problems arising due to sample inhomogeneity which adversely affect other analytical procedures. Our invention samples the entire sample under investigation with good penetration, and does not require an external neutron source or shielding. Additionally, no supplementary information is required about the container materials or wall thickness.

BRIEF DESCRIPTION OF THE DRAWINGS

The accompanying drawings, which are incorporated in and form a part of the specification, illustrate one embodiment of the present invention and, together with the description, serves to explain the principles of the invention. In the drawings.

DETAILED DESCRIPTION OF THE INVENTION

Figure 1:
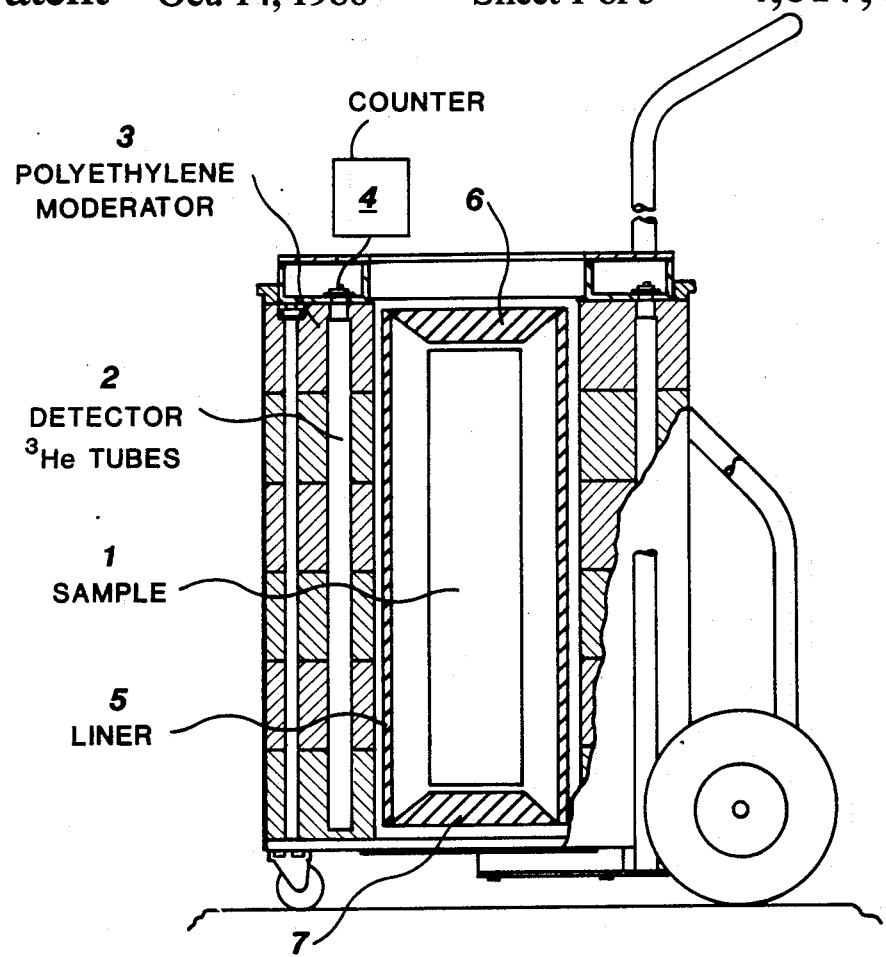
FIG. 1 is a schematic representation of the side view of the apparatus of the subject invention.

The subject invention is a passive neutron assay apparatus and method which directly interrogates nuclear fuel for fissile nuclide content. The measurement of the bulk fissile mass is achieved by simultaneously determining the rate of neutron coincidence emission (time-correlated) and the total neutron emission rate from the sample under investigation. The ratio of the coincidence rate to the total rate gives a direct measure of the fissile content of the sample, once the system is calibrated against a standard sample containing a known amount of fissile material. Random $(\alpha,n)$ neutrons from the sample itself induce fissions in the fissile material producing the observed neutrons.

There are two primary sources of neutrons from enriched samples of uranium. The dominant source is $(\alpha,n)$ neutrons from the alpha decay of $^{234}$U according to the reaction $^{19}F(\alpha,n)^{22}$Na. Uranium-238 is a source of spontaneous fission neutrons which account for only about 1% of the total neutron production for a sample having 20% enriched UF$_6$, about 0.25% for samples having 50% enrichment, and approximately 0.01% at a 98% enrichment level for typical UF$_6$ samples. Passive $(\alpha,n)$ neutrons born in the uranium may then induce fissions in the sample before being captured or escaping. The induced fissions occur predominantly in $^{235}$U, but may also occur in $^{238}$U for neutron energies above about 1 MeV. Since our invention teaches the measurement of coincident neutrons, these passive $(\alpha,n)$ neutrons do not contribute directly to the coincidence count rate because they occur randomly in time, but rather they contribute indirectly to the coincidence response by inducing fissions that yield prompt neutrons in short bursts.

In "Neutron Multiplication and Leakage Characteristics for UF$_6$ Cylinders," "Nuclear Safeguards Research and Development Program Status Report for September-December 1973," Los Alamos Scientific Laboratory Report LA-5557-PR (February 1974), pages 6-8, by R. A. Forster and R. B. Walton, the disclosure thereof being hereby incorporated by reference herein, the authors calculated the neutron leakage per source neutron from bare cylinders containing UF$_6$ for several $^{235}$U enrichments and two fill levels. They found: 1. that induced fissions account for a significant fraction of the neutron leakage from the cylinders; 2. that this fraction is nearly proportional to fissile mass; and 3. that the half-full cylinders are more highly multiplying than full ones containing the same UF$_6$ mass. The total neutron leakage from a cylinder is calculated, and no mention is made of coincidence counting of the emitted neutrons. Since the calculations were made for cylinders without any reflective material surrounding them, the magnitude of the induced-fission rate results from neutrons which have not escaped from the cylinder. In the practice of our invention, the passive $(\alpha,n)$ neutrons and their induced-fission progeny produce a leakage neutron current from the UF$_6$ sample in a thermal neutron well counter. Such instruments generally contain concentric rings of the $^3$He proportional counters in a polyethylene matrix. A fraction of the neutron leakage is reflected back into the UF$_6$ sample under investigation with a lower energy spectrum as a result of collisions with hydrogen nuclei bound in the polyethylene. Such neutrons are less likely to induce fissions in $^{238}$U because of their lower energy, but are capable of inducing fissions in any $^{235}$U present in the sample. Self-interrogation then refers to fissions induced by $(\alpha,n)$ self-source neutrons before being captured or leaving the sample in addition to fissions induced by returning neutrons having lower average energy than they had when they escaped from the sample. If a cadmium liner is inserted between the sample and the neutron well counter, reflected neutrons having energies less than 0.25 eV do not contribute to the self-interrogation since such slow neutrons cannnot penetrate the cadmium liner. Without the liner, the low-energy neutrons do not penetrate deeply into an enriched UF$_6$ sample. That is, the diffusion length in a solid UF$_6$ sample is about 4.4 mm at 20% enrichment, approximately 1.9 mm at 50% enrichment, and about 1 mm at 97% enrichment, where the diffusion length is defined as the average root-mean-square distance at which a plane source of thermal neutrons is reduced by a factor of e relative to the initial intensity. Returning thermal neutrons, therefore, produce an induced-fission coincidence response indicative of only the surface layer of UF$_6$. The second-generation fission neutrons produced near the surface of the sample, however, are sufficiently energetic to reach the interior of the sample.

As a result, two measurements are generally made according to the the present invention: a first measurement of the emerging neutrons with the liner in place, and a second with it removed, the second measurement being necessary to derive a correction for the first measurement in order to remove effects of variation in fill height and/or density of the samples in the containers employed.

The neutron coincidence count rate R is a measure of the induced-fission rate and therefore the $^{235}$U mass in the sample. The induced-fission rate is directly proportional to the (α,n) source strength S of the sample. Moreover, the total neutron count rate T is directly proportional to S. Since S is known to vary with enrichment and irradiation history of the sample material, a $^{235}U$ mass-dependent signature which is independent of S would be most useful. The neutron coincidence count rate divided by the total neutron count rate is such a passive signature. Generally, a small correction for the spontaneous fissions in $^{238}U$ is made to the neutron coincidence rate.

Figure 2:
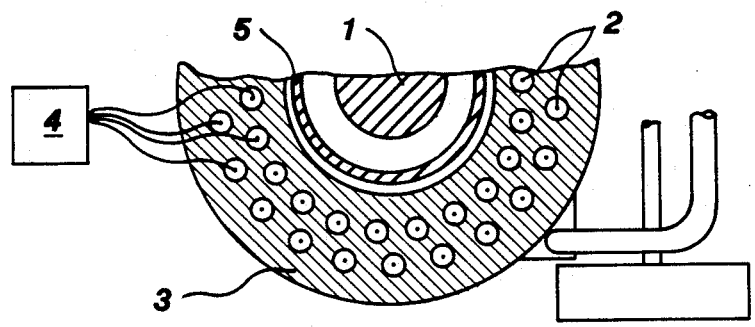
FIG. 2 is a schematic representation of the top view of the apparatus of the subject invention.

Turning now to the drawings, FIG. 1 is a schematic representation of the side view and FIG. 2 is a schematic representation of the top view of the apparatus of the subject invention. A sample to be investigated, usually cylindrical in shape 1, is placed approximately along the axis of a series of concentric banks of $^{3}He$ neutron detection tubes 2 embedded in a polyethylene matrix 3, each bank having its detection tubes arranged about the surface of a cylinder with the axis of each tube substantially parallel to the axis of the cylinder. Total neutron count rates and neutron coincidence count rates are measured and recorded on a conventional shift-register coincidence electronic counting system 4 to which the detector tubes are attached in parallel. End plugs 6, 7 can be provided to reflect the neutrons back into the sample, thereby enhancing the efficiency of the self-interrogation process. Aluminum metal serves adequately for this purpose. A removable slow neutron absorbing liner 5 permits the correction of the ratio of the coincidence neutron count rate to the total neutron count rate as will be described hereinbelow.

EXAMPLE

Figure 3:
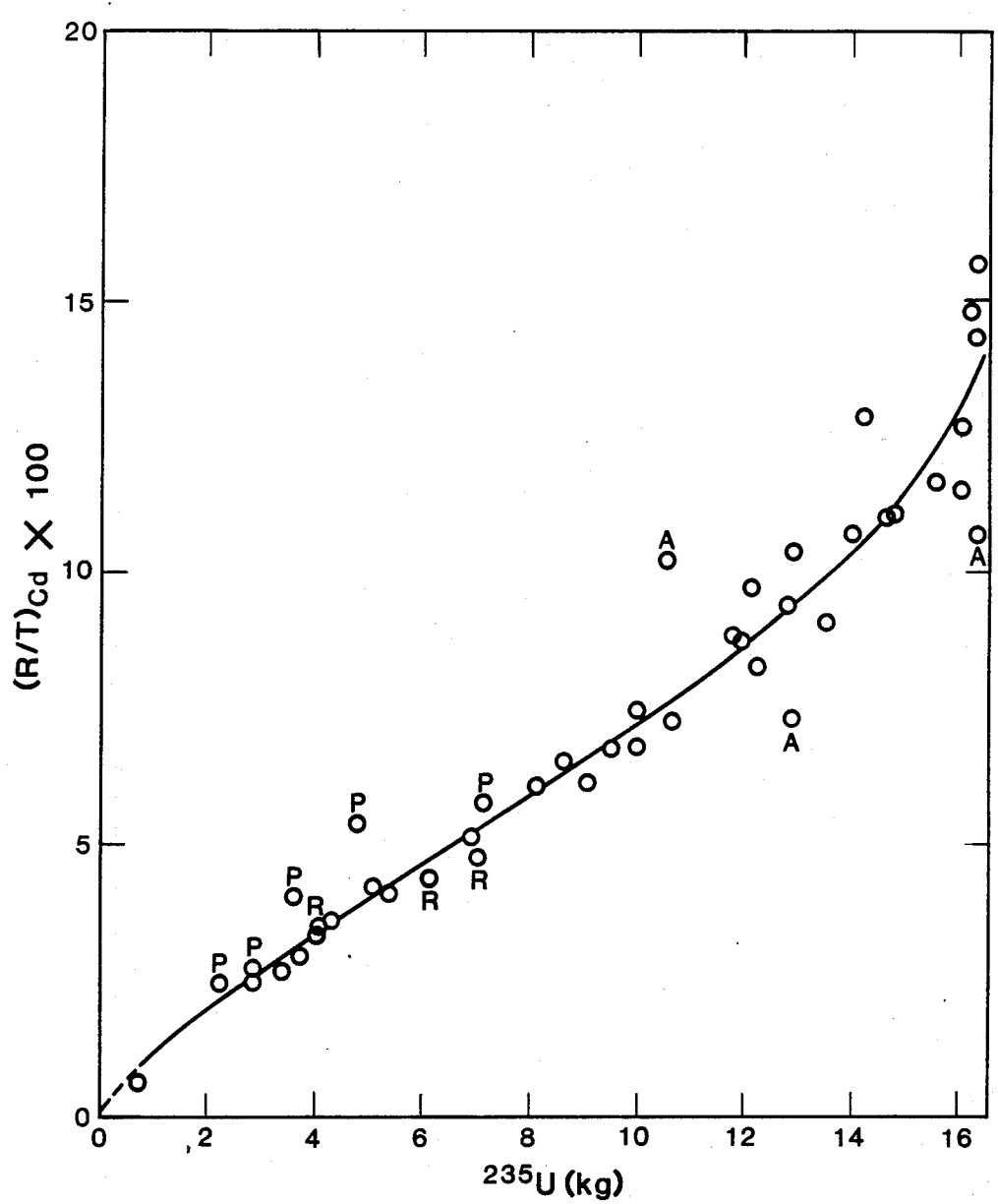
FIG. 3 is a graph of the coincidence neutron counts divided by the total neutron counts as a function of the $^{235}$U mass with the cadmium liner in place.

According to the teachings of the present invention, a typical measurement includes measuring the background neutrons for subsequent subtraction from the signals derived from the sample, placing the sample to be interrogated inside of the apparatus with the cadmium liner in place, measuring the total neutron and coincidence neutron count rates, and removing the cadmium liner and measuring the total neutron count rate. The increase in counting rate when the cadmium absorber is absent gives a correction for fill height and density variations in the sample, while the corrected R/T ratio gives the $^{235}U$ mass. Counting times for high fissile nuclide content samples were typically about 3 min while those for low fissile nuclide content were approximately 6 min. Cylinders of $UF_6$ containing from 1 to 16 kg of uranium with enrichments varying from natural to 97% $^{235}U$ have been measured. Measurements of samples containing $UO_2$ and $UF_4$ according to the present invention show that the method and apparatus of the subject invention may be successfully applied to such samples as well as to samples containing $UF_6$. For samples containing $UO_2$ or low-enrichment uranium, the spontaneous fission rate of the fertile material such as $^{238}U$ may be significant. A correction for this contribution may be made using the gross weight of the sample or the isotopic ratios of the uranium. The ratio of R/T was observed to be substantially proportional to the $^{235}U$ mass present. Typical results for some of the samples investigated are presented in the accompanying Table. FIG. 3, which displays the neutron coincidence count rate divided by the total neutron count rate with the cadmium liner in place plotted against the stated $^{235}U$ mass, graphically shows the results of these measurements.

TABLE

| Sample $UF_6$ Mass (g) | Uranium Mass (g) | $^{235}U$ Enrichment (%) | $^{235}U$ Mass (g) | Measured $^{235}U$ (g) | Difference (%) |
|---|---|---|---|---|---|
| 24559 | 16528 | 97.27 | 16077 | 15800 | −1.7 |
| 22528 | 15164 | 97.62 | 14803 | 14400 | −2.8 |
| 23659 | 15948 | 66.67 | 10633 | 10710 | +0.7 |
| 24178 | 16315 | 37.52 | 6121 | 6100 | −0.3 |
| 23721 | 16012 | 31.75 | 5084 | 5300 | +4.2 |
| 16119 | 10884 | 26.37 | 2870 | 2800 | −2.5 |

The coincident count rate has been corrected for $^{238}U$ spontaneous fission contributions and the total neutron emission count rate has been corrected for vault background. The $^{238}U$ correction was a constant 19.8 counts/s for all measurements. This value was obtained from laboratory measurements of depleted uranium metal cubes and agrees well with the value obtained using other methods. This correction is actually dependent on $^{238}U$ mass in the sample, but the correction is sufficiently small at high enrichments that the constant value taken for a 20%-enrichment cylinder (full) is adequate for other cases. The detector background varied from 80–150 counts/s during the measurements and was frequently updated.

Figure 4:
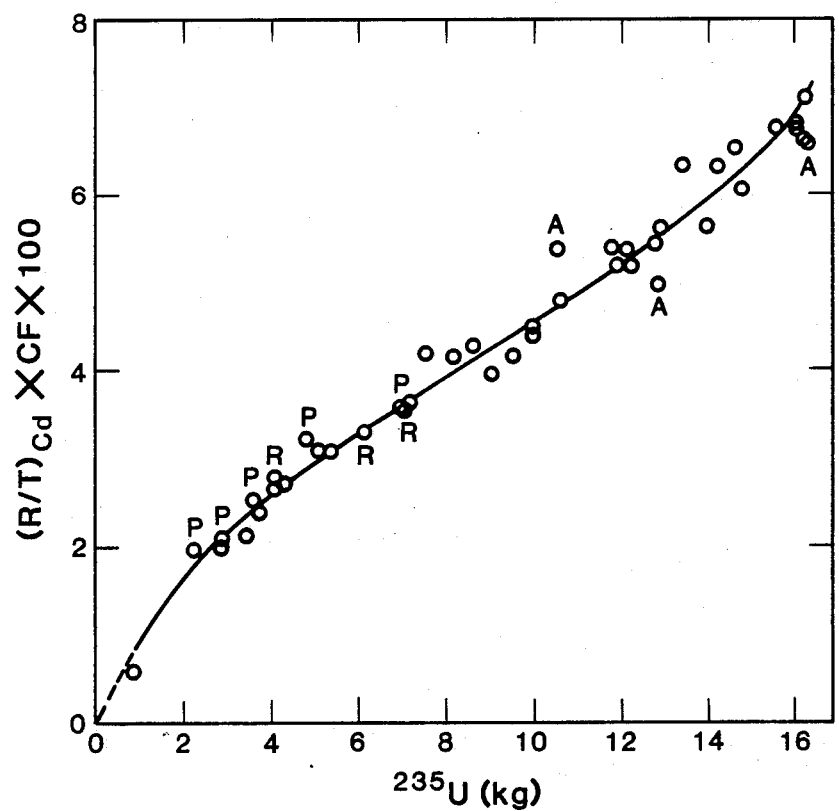
FIG. 4 is a graph of the coincidence neutron counts divided by the total neutron counts as a function of the $^{235}$U mass with the cadmium liner in place corrected for partial fill of and density changes in the sample container.

Random errors ($\pm 1\sigma$) in measured quantities are indicated in FIGS. 3 and 4 by the size of the circles. Excellent reproducibility was obtained for repeated measurements. Moreover, with a sample centered in the sample cavity and with the same sample touching the cavity wall, essentially the same results were obtained.

The labeled points of FIG. 3 correspond to the following:

P stands for partial fills, R stands for reject cylinders (for example, with high concentrations of technetium fission product), and A stands for outliers on which further analysis will be done. Measured values of $(R/T)_{Cd}$ for 44 cylinders were fitted with an unweighted, least squares cubic polynomial that is shown also in FIG. 3. The partial-fill data points all lie above the fitted curve of FIG. 3. This is because a given $^{235}U$ mass contained in a partially filled cylinder will result in a higher leakage multiplication than the same $^{235}U$ mass in a full cylinder. Uranium-235 mass density and sample geometry are the two key parameters determining sample multiplication. Because $(R/T)_{Cd}$ is a measure of sample multiplication, the partially filled cylinders have higher response than full cylinders for the same $^{235}U$ mass. The reject cylinders that are problems for NaI enrichment measurements are not problems with the $(R/T)_{Cd}$ technique of the subject invention. FIG. 3 also displays significant scatter in the data points for the high-mass samples that is not due to counting statistics. The fitted curve is nearly linear from 2–14 kg $^{235}U$, but for the higher mass samples, multiplication effects become more pronounced.

$R_{Cd}/\Delta T$, where $\Delta T$ is the difference in total emitted neutron count rates due to the cadmium liner, is inversely proportional to the sample surface area and directly proportional to the sample coincidence multiplication. The $R_{Cd}/\Delta T$ indicator has the property of magnifying the deviations of the partial fills and outliers from the straight-line fit. This feature suggested $R_{Cd}/\Delta T$ for use in a correction algorithm for the $(R/T)_{Cd}$ data. Several forms of correction algorithms were considered, but the one found most effective has the form $$CF = 1 - \frac{k}{\frac{n}{T_{Cd}}} \frac{R_{Cd}}{\Delta T},$$

where CF represents the correction for application to $(R/T)_{Cd}$ signature data and k and n are empirical constants. Values of k and n were determined by minimizing the standard deviation of differences in tag $^{235}$U masses and assay values determined from fitted curves through the corrected $(R/T)_{Cd}$ values. The "best" values of k and n were found to be 8.0 and 0.25, respectively, using an iterative procedure.

With the chosen form of the correction factor, both R and T are measured with the cadmium liner in place, and only the total emitted neutron count rate is required with the liner removed. For the cylinders used in the above-described measurements, the total emitted neutron count rate with no cadmium liner varied between 1800 and 85,000 counts/s. Thus, the form of the correction factor chosen minimizes counting time because the no-cadmium measurement need require only a few seconds as a result of the high totals rates. Generally, the precision of the $R_{Cd}$ measurement will dominate the precision of $CF \cdot (R/T)_{Cd}$.

Corrected values of $(R/T)_{Cd}$ signature data are plotted in FIG. 4. When these data are compared visually with those of FIG. 3 [uncorrected $(R/T)_{Cd}$ data], much less scatter is evident. The correction algorithm improved the assay accuracy (1$\sigma$) from 10.6% to 6.8%, or a factor of 1.6. Also, the algorithm markedly improved accuracy for partial fills and high-mass samples where $\sigma$ represents one standard deviation (relative) to the differences in assay and tag values for all cylinders. The partially filled cylinder assays were not as accurate as those for the reject cylinders that have been difficult to assay using the NaI/enrichment meter technique. Generally, however, the assay accuracies for problem cylinders were nearly as good as for the total cylinder population used to demonstrate the present invention as a whole.

In summary, the feasibility of a new technique for direct fissile mass verification of samples containing enriched uranium in the form of UF$_6$, UF$_4$ or UO$_2$ using random source self-interrogation and neutron coincidence response has been demonstrated. The corrected $(R/T)_{Cd}$ signature is the most accurate of those evaluated. This signature yields verification of bulk $^{235}$U mass in the sample within a few minutes of counting without the use of an external interrogation source and with an assay accuracy of 2-7% (1$\sigma$). The passive $(R/T)_{Cd}$ signature method is the first nondestructive assay technique able to verify the entire bulk fissile mass in a cylinder.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. An apparatus for determining the quantity of fissile nuclides contained in a sample having substantially one type of fissile nuclide in the presence of nuclides which spontaneously generate alpha particles and nuclides which interact with alpha particles to produce neutrons, by random self-interrogation and neutron coincidence response, said apparatus comprising in combination:
    a. a plurality of neutron detectors disposed in a substantially cylindrical manner around the cylindrical sample under investigation so that a fraction of neutrons escaping from the cylindrical sample as a result of fission processes in the fissile nuclides, ($\alpha$,n) processes in other nuclides, and from less important sources of neutrons are received and detected by said plurality of neutron detectors so as to produce signals which represent individual neutrons having been detected;
    b. means for receiving said signals produced from said plurality of neutron detectors and for recording the total number of neutrons exiting the sample and reaching said plurality of neutron detectors and the total number of neutrons reaching said plurality of neutron detectors in coincidence with a chosen time interval said means being used to provide the ratio of the number of neutrons reaching said plurality of neutron detectors in coincidence within the chosen time interval to the total number of neutrons reaching said plurality of neutron detectors, wherein said ratio is related substantially to the quantity of fissile material present in the sample under investigation.

2. The apparatus as described in claim 1, wherein a cylindrical cadmium sheet means is inserted between the sample and said plurality of neutron detectors so that the majority of the slow neutrons which would otherwise be returned to the sample as a result of backward scattering from said plurality of neutron detectors and which would cause fissions to occur in the fissile nuclides located substantially near to the surface of the sample are absorbed, said sheet means permitting the ratio of the number of neutrons reaching said plurality of neutron detectors in coincidence within the chosen time interval to the total number of neutrons reaching said plurality of neutron detectors to be corrected for variations in density of the sample under investigation and for samples which have not been completely filled.

3. The apparatus as described in claim 2, wherein said plurality of neutron detectors includes several banks of staggered polyethylene-moderated $^3$He counters disposed in a substantially coaxial cylindrical configuration.

4. The apparatus as described in claim 3, wherein said time interval is between 10 $\mu$s and 100 $\mu$s.

5. The apparatus as described in claim 4, wherein reflector means are placed above and below the sample in order to reflect neutrons back into the sample so as to improve the self-interrogation process.

6. A method for determining the quantity of fissile nuclides contained in a sample having substantially one type of fissile nuclide in the presence of nuclides which spontaneously generate alpha particles and nuclides which interact with alpha particles to produce neutrons, said method comprising the steps of:
    a. detecting a major portion of the neutrons emitted from the sample as a result of ($\alpha$,n) reactions so as to produce a signal which is proportional to the number of neutrons detected;

b. detecting a major portion of the neutrons emitted from the sample occurring in pairs within a chosen time period so as to produce a signal which is proportional to the number of neutron pairs detected; and c. forming the ratio of the signal which is proportional to the number of neutron pairs to the signal which is proportional to the number of neutrons detected, said ratio having substantial relationship to the quantity of fissile material contained in the sample under investigation.

7. The method as described in claim 6, wherein a substantial number of the neutrons are returned to the sample under investigation, wherein steps a to c of claim 6 are repeated, and wherein the resulting ratio is corrected by the signal produced in step a of claim 6 performed without said step of returning a substantial number of the neutrons to the sample under investigation, wherein the corrected ratio is more closely related to the quantity of fissile material contained in the sample under investigation than that formed according to claim 6.

8. The method as described in claim 7, wherein said time period is between 10 $\mu$s and 100 $\mu$s.

* * * * *